(12) United States Patent
Komagaki et al.

(10) Patent No.: US 8,902,549 B1
(45) Date of Patent: Dec. 2, 2014

(54) ENHANCED PINNING PROPERTY BY INSERTED SI SEED LAYER

(71) Applicants: Koujiro Komagaki, Odawara (JP);
Kouichi Nishioka, Hiratsuka (JP)

(72) Inventors: Koujiro Komagaki, Odawara (JP);
Kouichi Nishioka, Hiratsuka (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/923,518

(22) Filed: Jun. 21, 2013

(51) Int. Cl.
*G11B 5/127* (2006.01)
*G11B 5/39* (2006.01)

(52) U.S. Cl.
CPC ................................ *G11B 5/39* (2013.01)
USPC .......................................................... 360/319

(58) Field of Classification Search
USPC ............... 360/319, 314, 316, 236.5, 245.3
See application file for complete search history.

(56) References Cited

U.S. PATENT DOCUMENTS

| | | | |
|---|---|---|---|
| 7,035,059 B2 | 4/2006 | Gill | |
| 7,228,618 B2 | 6/2007 | Pinarbasi et al. | |
| 7,245,463 B2 | 7/2007 | Gill | |
| 7,268,979 B2 | 9/2007 | Gill | |
| 7,310,207 B2 | 12/2007 | Hasegawa et al. | |
| 7,362,547 B2 * | 4/2008 | Freitag et al. | 360/324.11 |
| 7,525,773 B2 | 4/2009 | Shimazawa et al. | |
| 7,872,837 B2 | 1/2011 | Gill | |
| 7,948,718 B2 | 5/2011 | Machita et al. | |
| 8,184,409 B2 | 5/2012 | Xue et al. | |
| 2002/0135935 A1* | 9/2002 | Covington | 360/126 |
| 2005/0213264 A1* | 9/2005 | Gill | 360/324.12 |

OTHER PUBLICATIONS

Beach et al.: "Orthogonal Pinning of Two Ferromagnetic Layers in a Synthetic Spin Valve"; Applied Physics Letters, vol. 80, issue 24, Magnetism and Superconductivity, Jan. 2002, 3 pages.
Jian-Gang Zhu: "New Heights for Hard Disk Drives"; Materials Today, issue 1369 7021, Jul./Aug. 2003, Department of Electrical and Computer Engineering and Data Storage Systems Centers, Carnegie Mellon University, Pittsburgh PA. 10 pages.

* cited by examiner

*Primary Examiner* — Allen T Cao
(74) *Attorney, Agent, or Firm* — Patterson & Sheridan, LLP

(57) ABSTRACT

The embodiments of the present invention generally relate to a magnetic head having a silicon seed layer disposed between a lower shield and a metallic underlayer to enhance the unidirectional anisotropy in an antiferromagnetic layer disposed over the metallic underlayer.

20 Claims, 5 Drawing Sheets

ENHANCED PINNING PROPERTY BY INSERTED SI SEED LAYER

BACKGROUND

1. Field

Embodiments of the present invention generally relate to a magnetic read head for use in a hard disk drive.

2. Description of the Related Art

The heart of a computer is a magnetic disk drive which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing, the write and read heads are employed for writing magnetic impressions to and reading magnetic signal fields from the rotating disk. The read and write heads are connected to processing circuitry that operates according to a computer program to implement the writing and reading functions.

The read head typically utilizes a spin valve-type magnetoresistive (MR) sensor, which has an antiferromagnetic layer, a pinned layer, an interlayer, and a free layer disposed between two magnetic shields. In order for the MR sensor to function correctly, the magnetization of the pinned layer may be pinned in one direction. The pinning of the magnetization direction of the pinned layer is achieved by unidirectional anisotropy induced from the antiferromagnetic layer.

Therefore, there is a need in the art for an improved MR sensor having high unidirectional anisotropy.

SUMMARY OF THE INVENTION

The embodiments of the present invention generally relate to a magnetic head having a silicon seed layer disposed between a lower shield and a metallic underlayer to enhance the unidirectional anisotropy in an antiferromagnetic layer disposed over the metallic underlayer.

In one embodiment, a magnetic head is disclosed. The magnetic head includes a first shield, a silicon seed layer disposed over the first shield, and a metallic underlayer disposed over the silicon seed layer. The metallic underlayer includes a first metallic sublayer and a second metallic sublayer. The magnetic head further includes an antiferromagnetic layer disposed over the metallic underlayer.

In another embodiment, a magnetic head is disclosed. The magnetic head includes a first shield, a silicon seed layer disposed over the first shield, and a metallic underlayer disposed over the silicon seed layer. The metallic underlayer includes at least a tantalum layer. The magnetic head further includes an antiferromagnetic layer disposed over the metallic underlayer.

In another embodiment, a magnetic head is disclosed. The magnetic head includes a first shield, a silicon seed layer disposed over the first shield, and a metallic underlayer disposed over the silicon seed layer. The metallic underlayer includes a tantalum layer and a NiFe layer. The magnetic head further includes an antiferromagnetic layer disposed over the metallic underlayer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The embodiments of the present invention generally relate to a magnetic head having a silicon seed layer disposed between a lower shield and a metallic underlayer to enhance the unidirectional anisotropy in an antiferromagnetic layer disposed over the metallic underlayer.

Figure 1:
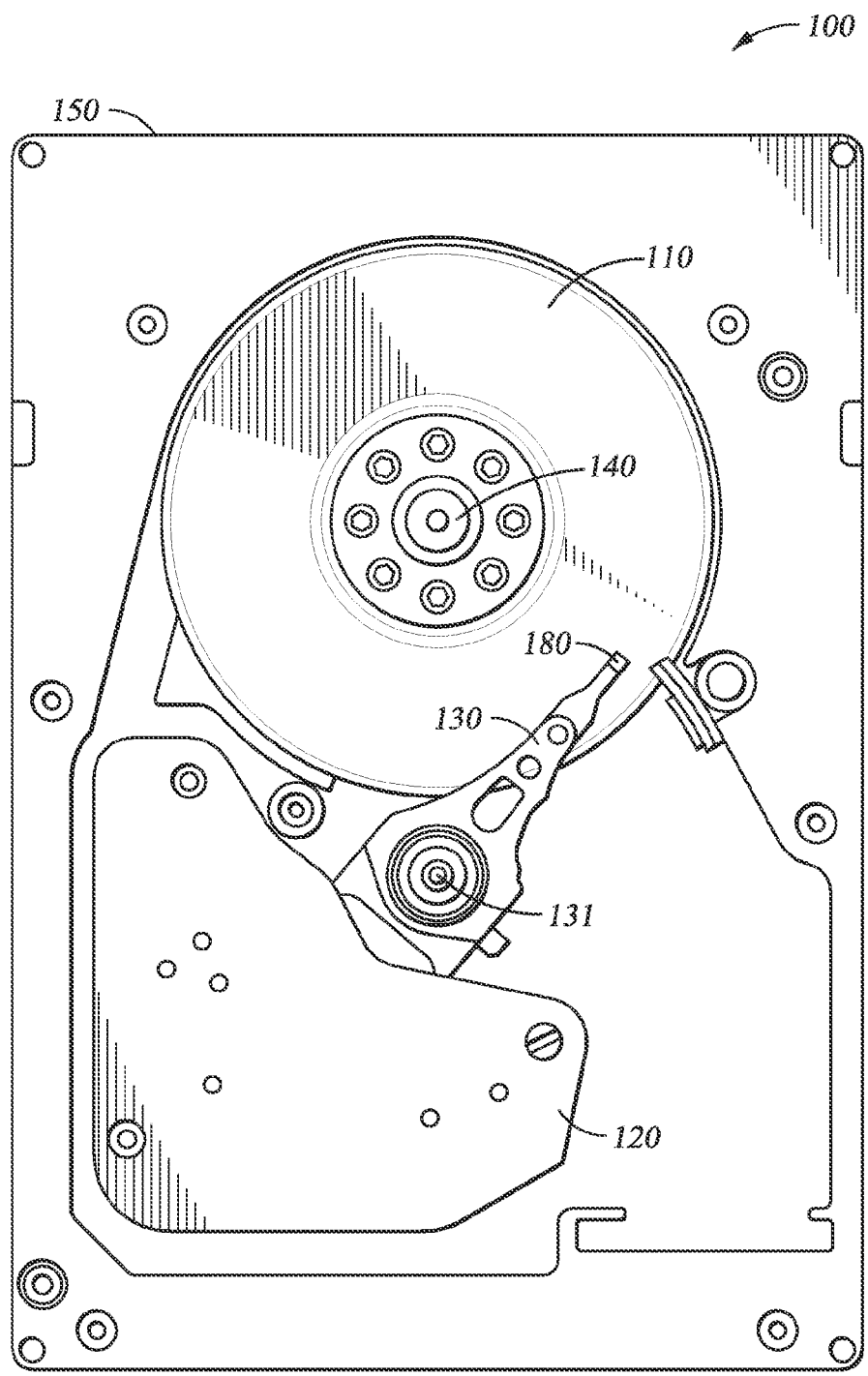
FIG. 1 illustrates an exemplary magnetic disk drive, according to an embodiment of the invention.

FIG. 1 illustrates a top view of an exemplary hard disk drive (HDD) 100, according to an embodiment of the invention. As illustrated, HDD 100 may include one or more magnetic disks 110, actuator 120, actuator arms 130 associated with each of the magnetic disks, and spindle motor 140 affixed in a chassis 150. The one or more magnetic disks 110 may be arranged vertically as illustrated in FIG. 1. Moreover, the one or more magnetic disks may be coupled with the spindle motor 140.

Magnetic disks 110 may include circular tracks of data on both the top and bottom surfaces of the disk. A magnetic head 180 mounted on a slider may be positioned on a track. As each disk spins, data may be written on and/or read from the data track. Magnetic head 180 may be coupled to an actuator arm 130 as illustrated in FIG. 1. Actuator arm 130 may be configured to swivel around actuator axis 131 to place magnetic head 180 on a particular data track.

Figure 2:
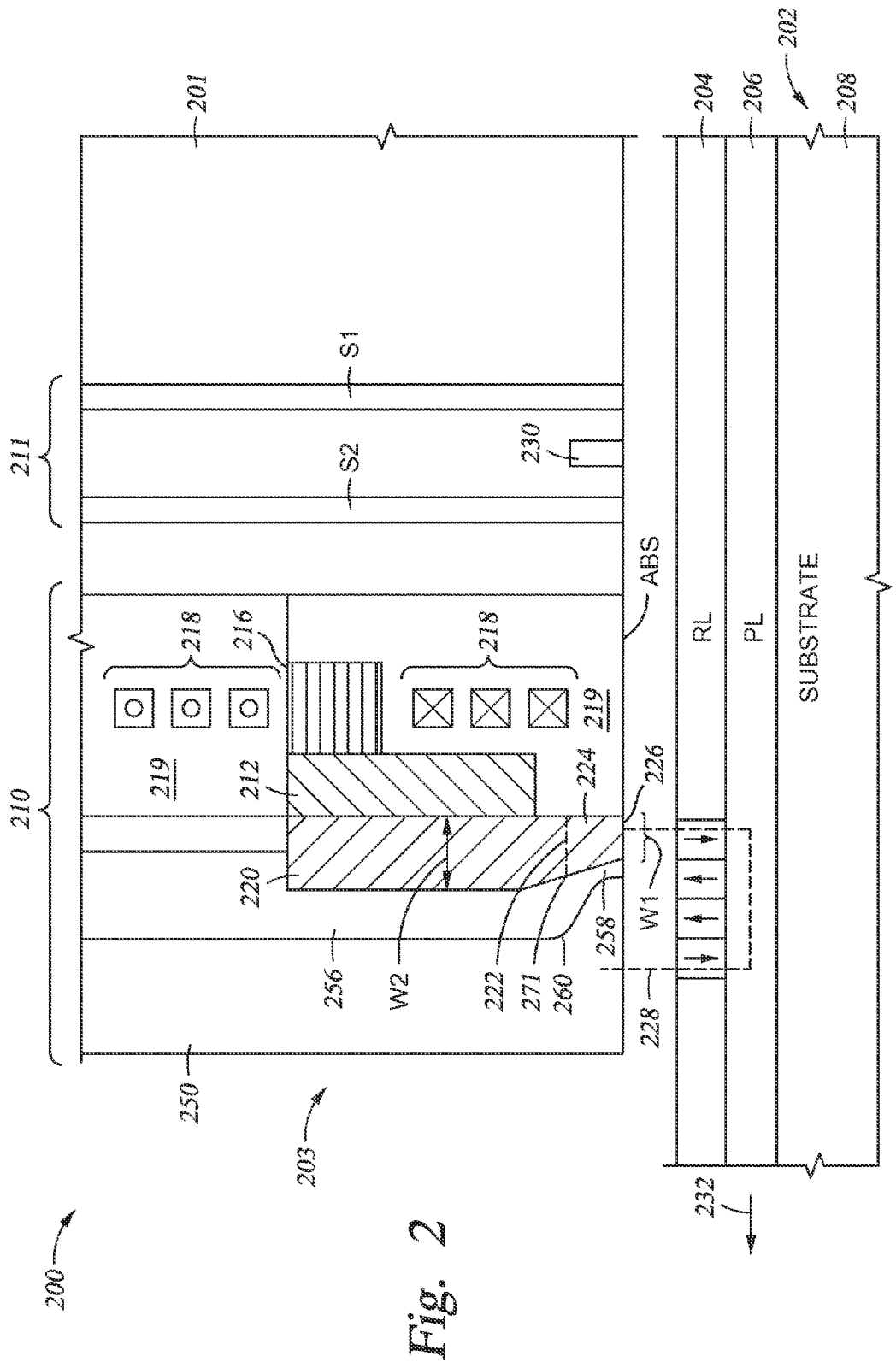
FIG. 2 is a cross-sectional view of a read/write head and magnetic disk of the disk drive of FIG. 1, according to one embodiment of the invention.

FIG. 2 is a fragmented, cross-sectional side view through the center of a read/write head 200 mounted on a slider 201 and facing magnetic disk 202. The read/write head 200 and magnetic disk 202 may correspond to the magnetic head 180 and magnetic disk 110, respectively in FIG. 1. In some embodiments, the magnetic disk 202 may be a "dual-layer" medium that includes a perpendicular magnetic data recording layer (RL) 204 on a "soft" or relatively low-coercivity magnetically permeable underlayer (PL) 206 formed on a disk substrate 208. The read/write head 200 includes an ABS, a magnetic write head 210 and a magnetic read head 211, and is mounted such that the ABS is facing the magnetic disk 202. In FIG. 2, the disk 202 moves past the write head 210 in the direction indicated by the arrow 232, so the portion of slider 201 that supports the read/write head 200 is often called the slider "trailing" end 203.

The magnetic read head 211 is a MR read head that includes a MR sensing element 230 located between MR shields S1 and S2. The RL 204 is illustrated with perpendicularly recorded or magnetized regions, with adjacent regions having magnetization directions, as represented by the arrows located in the RL 204. The magnetic fields of the adjacent magnetized regions are detectable by the MR sensing element 230 as the recorded bits.

The write head 210 includes a magnetic circuit made up of a main pole 212 and a yoke 216. The write head 210 also includes a thin film coil 218 shown in the section embedded in non-magnetic material 219 and wrapped around yoke 216. In an alternative embodiment, the yoke 216 may be omitted, and the coil 218 may wrap around the main pole 212. A write pole 220 is magnetically connected to the main pole 212 and has an end 226 that defines part of the ABS of the magnetic write head 210 facing the outer surface of disk 202.

Write pole 220 is a flared write pole and includes a flare point 222 and a pole tip 224 that includes an end 226 that defines part of the ABS. The flare may extend the entire height of write pole 220 (i.e., from the end 226 of the write pole 220 to the top of the write pole 220), or may only extend from the flare point 222, as shown in FIG. 2A. In one embodiment the distance between the flare point 222 and the ABS is between about 30 nm and about 150 nm.

The write pole 220 includes a tapered surface 271 which increases a width of the write pole 220 from a first width W1 at the ABS to a second width W2 away from the ABS. In one embodiment, the width W1 may be between around 60 nm and 200 nm, and the width W2 may be between around 120 nm and 350 nm. While the tapered region 271 is shown with a single straight surface in FIG. 2, in alternative embodiment, the tapered region 271 may include a plurality of tapered surface with different taper angles with respect to the ABS.

The tapering improves magnetic performance. For example, reducing the width W1 at the ABS may concentrate a magnetic field generated by the write pole 220 over desirable portions of the magnetic disk 202. In other words, reducing the width W1 of the write pole 220 at the ABS reduces the probability that tracks adjacent to a desirable track are erroneously altered during writing operations.

While a small width of the write pole 220 is desired at the ABS, it may be desirable to have a greater width of the write pole 220 in areas away from the ABS. A larger width W2 of the write pole 220 away from the ABS may desirably increase the magnetic flux to the write pole 220, by providing a greater thickness of the write pole 220 in a direction generally parallel to the ABS. In operation, write current passes through coil 218 and induces a magnetic field (shown by dashed line 228) from the write pole 220 that passes through the RL 204 (to magnetize the region of the RL 204 beneath the write pole 220), through the flux return path provided by the PL 206, and back to an upper return pole 250. In one embodiment, the greater the magnetic flux of the write pole 220, the greater is the probability of accurately writing to desirable regions of the RL 204.

FIG. 2 further illustrates one embodiment of the upper return pole or magnetic shield 250 that is separated from write pole 220 by a nonmagnetic gap layer 256. In some embodiments, the magnetic shield 250 may be a trailing shield wherein substantially all of the shield material is on the trailing end 203. Alternatively, in some embodiments, the magnetic shield 250 may be a wrap-around shield wherein the shield covers the trailing end 203 and also wraps around the sides of the write pole 220. As FIG. 2 is a cross section through the center of the read/write head 200, it represents both trailing and wrap-around embodiments.

Near the ABS, the nonmagnetic gap layer 256 has a reduced thickness and forms a shield gap throat 258. The throat gap width is generally defined as the distance between the write pole 220 and the magnetic shield 250 at the ABS. The shield 250 is formed of magnetically permeable material (such as Ni, Co and Fe alloys) and gap layer 256 is formed of nonmagnetic material (such as Ta, TaO, Ru, Rh, NiCr, SiC or $Al_2O_3$). A taper 260 in the gap material provides a gradual transition from the throat gap width at the ABS to a maximum gap width above the taper 260. This gradual transition in width forms a tapered bump in the non-magnetic gap layer that allows for greater magnetic flux density from the write pole 220, while avoiding saturation of the shield 250.

It should be understood that the taper 260 may extend either more or less than is shown in FIG. 2. The taper may extend upwards to an end of shield 250 opposite the ABS (not shown), such that the maximum gap width is at the end of the shield opposite the ABS. The gap layer thickness increases from a first thickness (the throat gap width) at the ABS to greater thicknesses at a first distance from the ABS, to a greatest thickness at a second distance (greater than the first distance) from the ABS.

Figure 3:
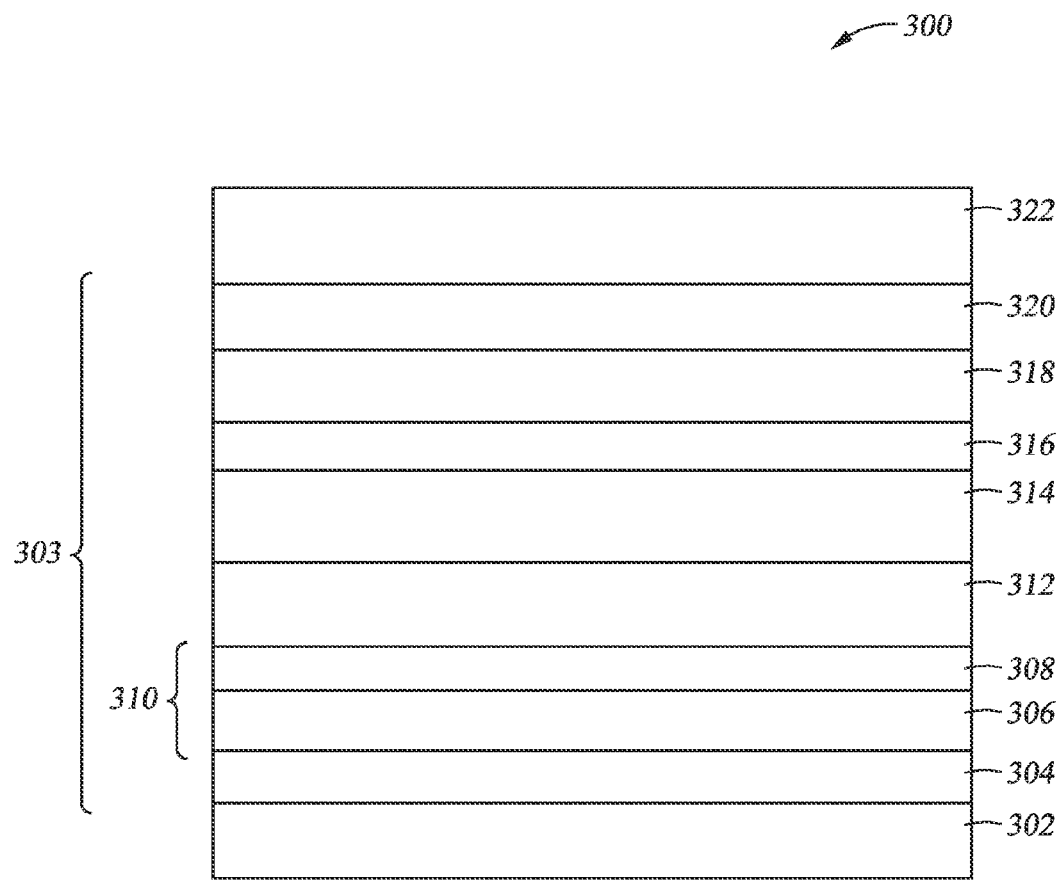
FIG. 3 is a schematic cross-sectional view of portions of a layer structure of a magnetic head.

FIG. 3 is a schematic cross-sectional view of portions of a layer structure 300 of the magnetic head 211 according to one embodiment. The layer structure 300 includes a first shield layer 302 and a second shield layer 322, both comprising a magnetic material. Suitable magnetic materials that may be utilized include Ni, Fe, Co, NiFe, NiFeCo, NiCo, CoFe and combinations thereof.

Between the first and second shield layers 302, 322 is a sensor structure 303. The sensor structure includes a silicon seed layer 304, a metallic underlayer 310, an antiferromagnetic layer 312, a pinned magnetic layer 314, an interlayer 316, a free layer 318 and a capping layer 320. The metallic underlayer 310 may enhance the crystallinity of the antiferromagnetic layer 312, which helps achieving high unidirectional anisotropy induced from the antiferromagnetic layer 312. However, if the metallic underlayer 310 is deposited on the first shield layer 302, the crystal structure of the first shield layer 302 may affect the antiferromagnetic layer 312 through the metallic underlayer 310, causing difficulties in achieving sufficiently high degree of unidirectional anisotropy. By placing the silicon seed layer 304 between the first shield layer 302 and the metallic underlayer 310, high unidirectional anisotropy induced from the antiferromagnetic layer 312 may be achieved. In addition, it has been found that the temperature at which unidirectional anisotropy is lost is increased with the addition of the silicon seed layer 304, which provides a stable pinned magnetic layer 314 with respect to temperature.

The silicon seed layer 304 may be disposed over the first shield layer 302 and may have a thickness ranging from about 0.2 nm to about 1.0 nm. In one embodiment, the silicon seed layer 304 has a thickness of about 0.6 nm. The metallic underlayer 310 may be disposed over the silicon seed layer 304. The metallic underlayer 310 may be a multi-layer structure including a first sublayer 308 disposed on a second sublayer 306. The first sublayer 308 may be made of a metal such as NiFe, NiCr, Ru, Cu, or combinations thereof. The first sublayer 308 may have a thickness ranging from about 1 nm to about 3 nm. The second sublayer 306 may be made of a metal such as tantalum, hafnium, or alloys thereof and may have a thickness ranging from about 0.5 nm to about 3.0 nm. In one embodiment, the first sublayer 308 is made of NiFe and the second sublayer 306 is made of tantalum.

The antiferromagnetic layer 312 may be disposed over the metallic underlayer 310. The antiferromagnetic layer 312 may be made of IrMn, PtMn, or the like and may have a thickness ranging from about 4 nm to about 15 nm. Disposed over the antiferromagnetic layer 312 is the pinned magnetic layer 314. The pinned magnetic layer 314 may be a single layer made of a magnetic material such as CoFe or the like and may have a thickness ranging from about 1 nm to about 5 nm. Alternatively, the pinned magnetic layer 314 may be a multi-layer structure. In one embodiment, the pinned magnetic layer 314 has a first layer made of a magnetic material such as CoFe, a second layer made of a magnetic material such as CoFe, CoFeB, or the like, and a third layer made of a non-magnetic material sandwiched between the first layer and the second layer. The first and second layers may each have a thickness ranging from about 1 nm to about 5 nm. The third layer may include Ru, Rh, Ir, Cu, or alloys thereof and may have a thickness ranging from about 0.4 nm to about 0.8 nm.

Disposed over the pinned magnetic layer 314 is the interlayer 316. The interlayer 316 may be a tunnel barrier layer including Al, Si, Mg, Ca, Sr, Zn, or the like. Alternatively, the interlayer 316 may be a metal conducting layer including Cu, Al, Ag, Sn, or the like. The free layer 318 may be disposed over the interlayer 316. The free layer 318 may be a multi-layer structure including a first layer made of a magnetic material such as CoFe or the like and a second layer made of a magnetic material such as NiFe or the like. The first and second layers each has a thickness ranging from about 1 nm to about 5 nm. The capping layer 320 may include a nonmagnetic material such as Ta, Ru, Ti, V, Cu, or the like. The capping layer 320 may have a thickness ranging from about 0.5 nm to about 5.0 nm.

Figure 4:
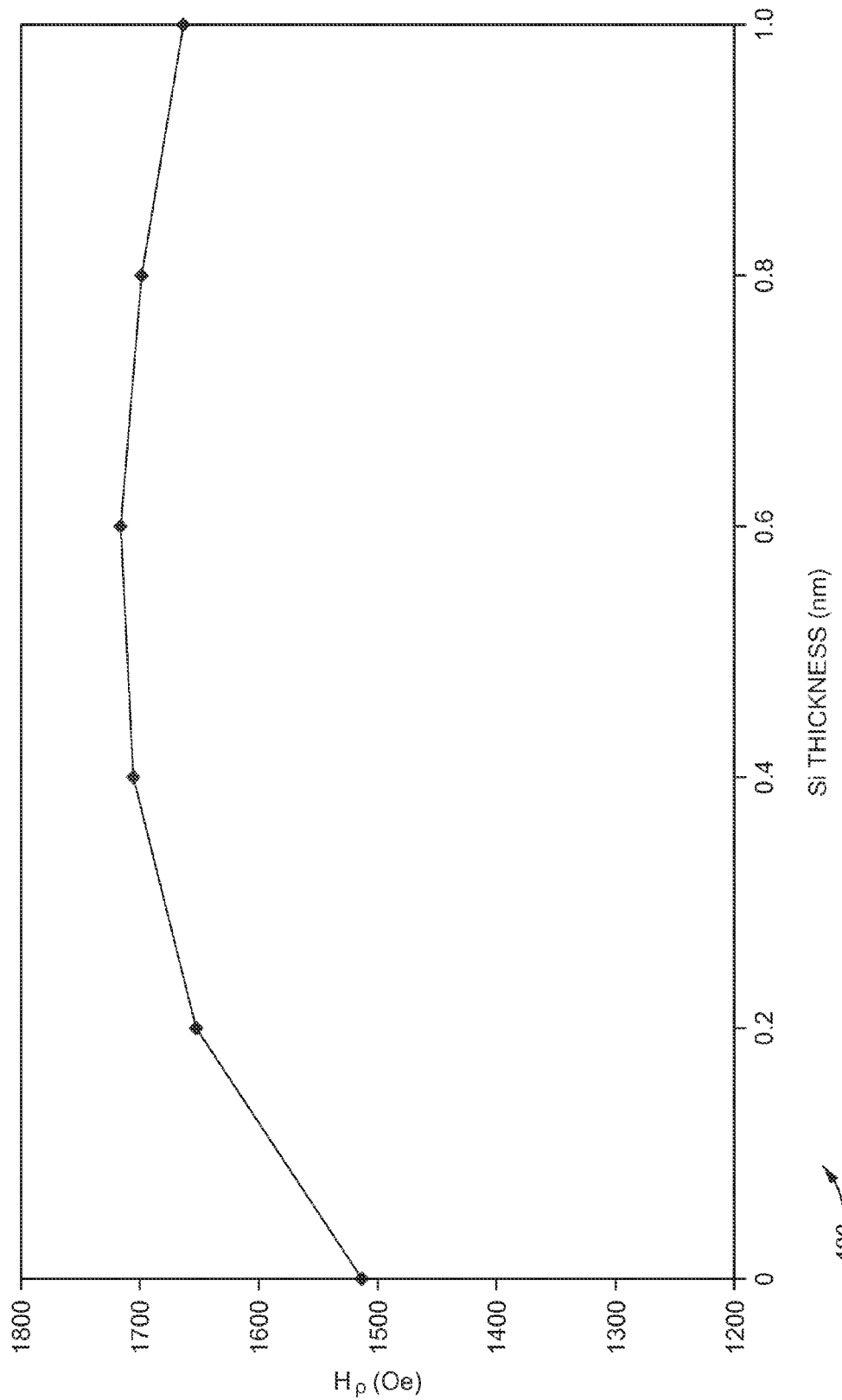
FIG. 4 is a graph showing a relationship between the thickness of a silicon seed layer and the magnetic field applied to a pinned magnetic layer, according to various embodiments.

FIG. 4 is a graph 400 showing a relationship between the thickness of the silicon seed layer 304 and the magnetic field applied to the pinned magnetic layer 314, according to various embodiments. As shown in the graph 400, the magnetic field is at the lowest point when there is no silicon seed layer 304 (i.e., silicon thickness equals 0). Thus, with the silicon seed layer 304 (i.e., silicon thickness is greater than 0), a high unidirectional anisotropic magnetic field may be obtained.

Figure 5:
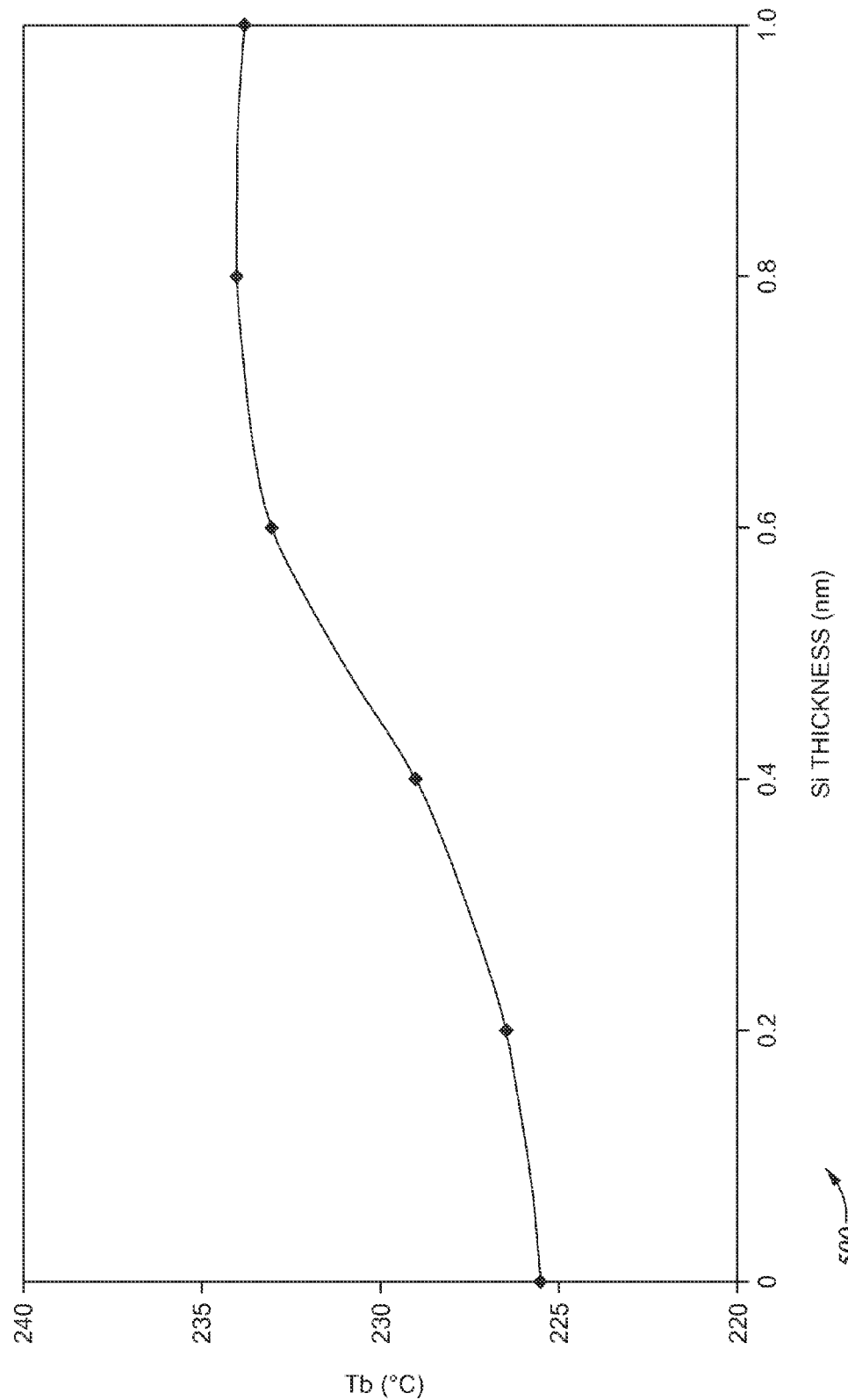
FIG. 5 is a graph showing a relationship between the thickness of the silicon seed layer and the temperature at which the magnetic field applied to the pinned magnetic layer is lost, according to various embodiments.

FIG. 5 is a graph 500 showing a relationship between the thickness of the silicon seed layer 304 and the temperature at which the magnetic field applied to the pinned magnetic layer 314 is lost, according to various embodiments. As shown in graph 500, the temperature at which the magnetic field is lost is at the lowest point when there is no silicon seed layer 304 (i.e., silicon thickness equals 0). With the silicon seed layer 304 (i.e., silicon thickness greater than 0), the pinned magnetic layer 314 may be stable with respect to temperature.

In summary, by placing a silicon seed layer between a shield and a metallic underlayer, a high unidirectional anisotropy in the antiferromagnetic layer may be obtained. The silicon seed layer may have a thickness ranging from about 0.2 nm to about 1 nm.

While the foregoing is directed to embodiments of the present invention, other and further embodiments of the invention may be devised without departing from the basic scope thereof, and the scope thereof is determined by the claims that follow.

What is claimed is:

1. A magnetic head, comprising:
   a first shield;
   a silicon seed layer disposed over the first shield;
   a metallic underlayer disposed over the silicon seed layer, wherein the metallic underlayer comprises a first metallic sublayer and a second metallic sublayer; and
   an antiferromagnetic layer disposed over the metallic underlayer.

2. The magnetic head of claim 1, wherein the silicon seed layer has a thickness ranging from about 0.2 nm to about 1 nm.

3. The magnetic head of claim 1, wherein the first metallic sublayer comprises a material selected from the group consisting of NiFe, NiCr, Ru, Cu, and combinations thereof.

4. The magnetic head of claim 3, wherein the second metallic sublayer comprises a material selected from the group consisting of Ta, Hf, and alloys thereof.

5. The magnetic head of claim 1, wherein the antiferromagnetic layer comprises IrMn or PtMn.

6. The magnetic head of claim 1, further comprising:
   a pinned magnetic layer disposed over the antiferromagnetic layer;
   an interlayer disposed over the pinned magnetic layer;
   a free layer disposed over the interlayer;
   a capping layer disposed over the free layer; and
   a second shield disposed over the capping layer.

7. The magnetic head of claim 6, wherein the pinned magnetic layer comprises CoFe.

8. The magnetic head of claim 6, wherein the pinned magnetic layer comprises a first magnetic layer, a second magnetic layer, and a nonmagnetic layer sandwiched between the first and second magnetic layers.

9. The magnetic head of claim 8, wherein the first magnetic layer comprises CoFe, the second magnetic layer comprises a material selected from the group consisting CoFe and CoFeB, and the nonmagnetic layer comprises a material selected from the group consisting Ru, Rh, Ir, Cu, and alloys thereof.

10. The magnetic head of claim 6, wherein the interlayer comprises a material selected from the group consisting Al, Si, Mg, Ca, Sr, and Zn.

11. The magnetic head of claim 6, wherein the free layer comprises a first magnetic layer comprising CoFe and a second magnetic layer comprising NiFe.

12. A magnetic head, comprising:
    a first shield;
    a silicon seed layer disposed over the first shield;
    a metallic underlayer disposed over the silicon seed layer, wherein the metallic underlayer comprises at least a tantalum sublayer; and
    an antiferromagnetic layer disposed over the metallic underlayer.

13. The magnetic head of claim 12, wherein the silicon seed layer has a thickness ranging from about 0.2 nm to about 1 nm.

14. The magnetic head of claim 12, wherein the metallic underlayer further comprises a metallic sublayer comprising a material selected from the group consisting NiFe, NiCr, Ru, Cu and combinations thereof.

15. The magnetic head of claim 12, wherein the antiferromagnetic layer comprises IrMn or PtMn.

16. The magnetic head of claim 12, further comprising:
- a pinned magnetic layer disposed over the antiferromagnetic layer;
- an interlayer disposed over the pinned magnetic layer;
- a free layer disposed over the interlayer;
- a capping layer disposed over the free layer; and
- a second shield disposed over the capping layer.

17. A magnetic head, comprising:
- a first shield;
- a silicon seed layer disposed over the first shield;
- a metallic underlayer disposed over the silicon seed layer, wherein the metallic underlayer comprises a tantalum layer and a NiFe layer; and
- an antiferromagnetic layer disposed over the metallic underlayer.

18. The magnetic head of claim 17, wherein the silicon seed layer has a thickness ranging from about 0.2 nm to about 1 nm.

19. The magnetic head of claim 17, wherein the antiferromagnetic layer comprises IrMn or PtMn.

20. The magnetic head of claim 17, further comprising:
- a pinned magnetic layer disposed over the antiferromagnetic layer;
- an interlayer disposed over the pinned magnetic layer;
- a free layer disposed over the interlayer;
- a capping layer disposed over the free layer; and
- a second shield disposed over the capping layer.

* * * * *

UNITED STATES PATENT AND TRADEMARK OFFICE
CERTIFICATE OF CORRECTION

PATENT NO. : 8,902,549 B1
APPLICATION NO. : 13/923518
DATED : December 2, 2014
INVENTOR(S) : Komagaki et al.

It is certified that error appears in the above-identified patent and that said Letters Patent is hereby corrected as shown below:

Title Page, (71) Applicants:

Please delete "Koujiro Komagaki, Odawara (JP); Kouichi Nishioka, Hiratsuka (JP)" and insert --HGST Netherlands B.V., Amsterdam (NL)-- therefor.

Signed and Sealed this
Twenty-third Day of June, 2015

Michelle K. Lee
*Director of the United States Patent and Trademark Office*